(12) United States Patent
Kester et al.

(10) Patent No.: US 10,288,771 B1
(45) Date of Patent: May 14, 2019

(54) SUBSTRATE DEPOSITION SYSTEMS

(71) Applicant: QUANTUM INNOVATIONS, INC., Central Point, OR (US)

(72) Inventors: Norman L. Kester, Rogue River, OR (US); Cliff J. Leidecker, Rogue River, OR (US)

(73) Assignee: QUANTUM INNOVATIONS, INC., Central Point, OR (US)

( * ) Notice: Subject to any disclaimer, the term of this patent is extended or adjusted under 35 U.S.C. 154(b) by 0 days.

(21) Appl. No.: 15/730,324

(22) Filed: Oct. 11, 2017

Related U.S. Application Data

(60) Division of application No. 14/088,370, filed on Nov. 23, 2013, now abandoned, which is a continuation-in-part of application No. 13/653,352, filed on Oct. 16, 2012, and a continuation-in-part of application No. 13/030,091, filed on Feb. 17, 2011.

(60) Provisional application No. 61/613,366, filed on Mar. 20, 2012, provisional application No. 61/338,951, filed on Feb. 26, 2010, provisional application No. 61/343,668, filed on May 3, 2010, provisional application No. 61/343,669, filed on May 3, 2010, provisional application No. 61/343,672, filed on May 3, 2010, provisional application No. 61/338,949, filed on Feb. 26, 2010.

(51) Int. Cl.
*B05C 9/04* (2006.01)
*G02B 1/11* (2015.01)

(52) U.S. Cl.
CPC . *G02B 1/11* (2013.01); *B05C 9/04* (2013.01)

(58) Field of Classification Search
None
See application file for complete search history.

(56) References Cited

U.S. PATENT DOCUMENTS

| | | | |
|---|---|---|---|
| 2009/0169766 A1* | 7/2009 | Takahashi | C23C 14/32 427/523 |
| 2014/0007810 A1* | 1/2014 | Hoshizawa | G01B 11/14 118/713 |

* cited by examiner

*Primary Examiner* — Jethro M. Pence
(74) *Attorney, Agent, or Firm* — Jerry Haynes Law

(57) ABSTRACT

A substrate deposition system includes a system frame; a plurality of processing tanks carried by the system frame, the plurality of processing tanks adapted to contain liquid coating materials of different light refractive indexes; at least one actuator disposed in proximity to the plurality of processing tanks, the at least one actuator adapted to sequentially immerse at least one substrate in the liquid coating materials and transfer the at least one substrate between the plurality of processing tanks; and at least one coating system located in a process flow downstream direction from the plurality of processing tanks, the at least one coating system adapted to apply an antireflective coating to the at least one substrate. A lens surface location measuring system is also disclosed.

12 Claims, 11 Drawing Sheets

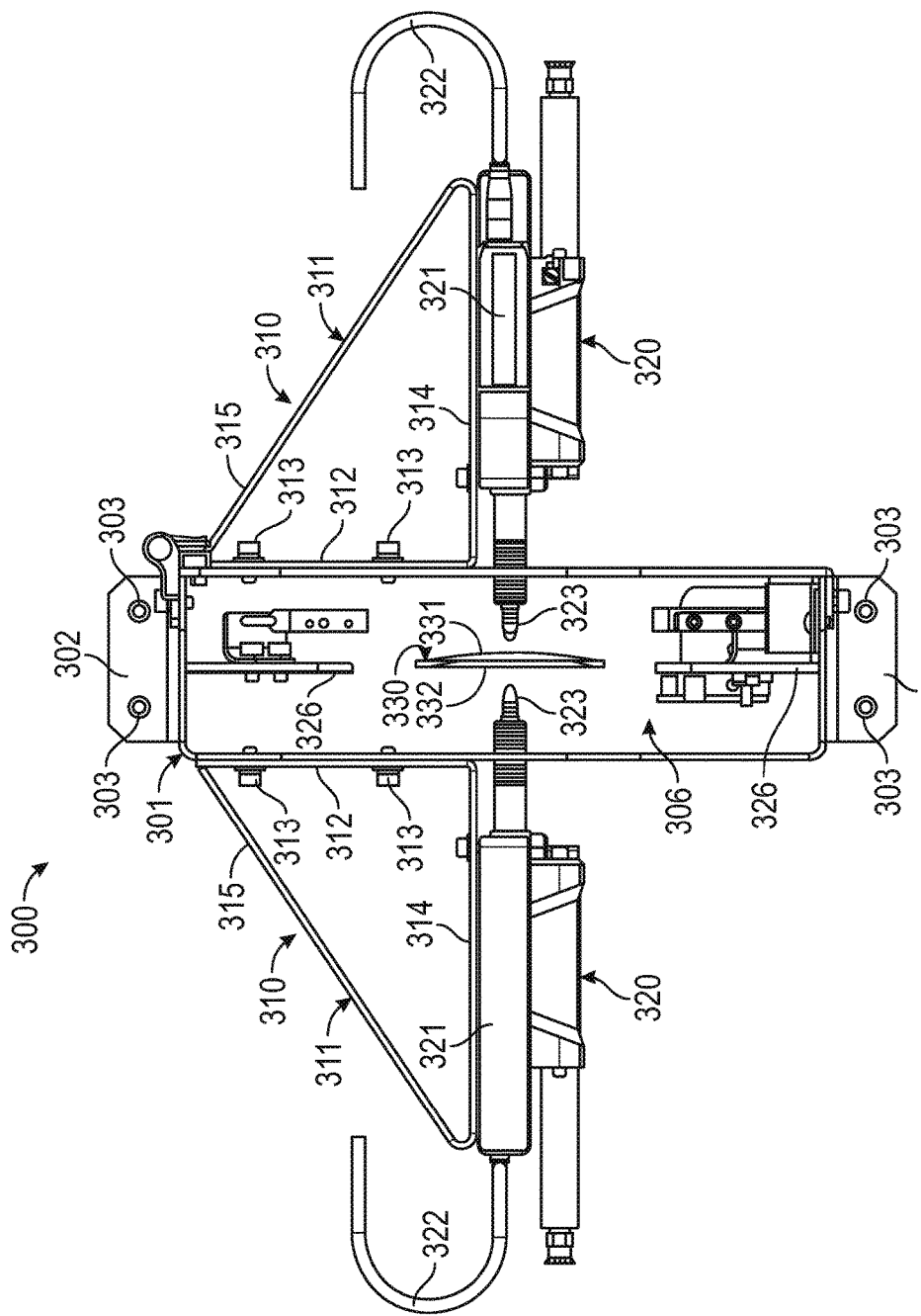

SUBSTRATE DEPOSITION SYSTEMS

CROSS-REFERENCE TO RELATED APPLICATIONS

This is a division of U.S. patent application Ser. No. 14/088,370, filed Nov. 23, 2013 and entitled SUBSTRATE DEPOSITION SYSTEMS, which is a continuation-in-part and claims the benefit of U.S. patent application Ser. No. 13/653,352, filed Oct. 16, 2012 and entitled VAPOR DEPOSITION SYSTEM AND METHOD, which claims the benefit of U.S. provisional patent application No. 61/613,366, filed Mar. 20, 2012 and entitled VAPOR DEPOSITION SYSTEM AND METHOD, which application is incorporated by reference herein in its entirety; and this application is a continuation-in-part of U.S. Ser. No. 13/030,091, filed on Feb. 17, 2011 entitled "VAPOR DEPOSITION SYSTEM AND METHOD, which in turn claims the benefit of U.S. provisional application No. 61/338,949, filed Feb. 26, 2010 and entitled "FIXTURE TO SUSPEND OPTHALMIC LENSES FOR CONCAVE AND CONVEX SIDE APPLICATIONS; U.S. provisional application No. 61/338,951, filed Feb. 26, 2010 and entitled "FIXTURE DEVICE FOR THE APPLICATION OF VAPOR DEPOSITION ON THE CONCAVE AND CONVEX SIDES OF AN OPHTHALMIC LENS WHILE ROTATING"; U.S. provisional application No. 61/343,668, filed May 3, 2010 and entitled "GRAVITY FED TRANSFER MECHANISM"; U.S. provisional application No. 61/343,669, filed May 3, 2010 and entitled "HYDROPHOBIC, OLEOPHOBIC OR SUPER HYDROPHOBIC APPLICATOR"; and U.S. provisional application No. 61/343,672, filed May 3, 2010 and entitled "FULLY AUTOMATED, IN-LINE, HIGH THROUGHPUT, LOW VOLUME, SIMULTANEOUS AND NON-SIMULTANEOUS PROCESS, HIGH AND LOW VACUUM, PHYSICAL VAPOR DEPOSTION SYSTEM, each of which applications is incorporated by reference herein in its entirety.

FIELD OF THE INVENTION

The disclosure generally relates to coatings for optical lenses and other substrates. More particularly, the disclosure relates to substrate deposition systems which facilitate sequential application of coatings to an optical lens or other substrate.

BACKGROUND OF THE INVENTION

Optical lenses of eyewear such as eyeglasses and sunglasses may include one or more optical coatings which impart a desired appearance or optical characteristic to the lenses. An optical coating includes one or multiple layers of material which are deposited on one or both sides of an optical lens and affects the manner in which the lens reflects, absorbs and transmits light. Antireflective coatings and high-reflection coatings are examples of optical coatings which may be applied to an optical lens.

A common method of applying an optical coating to an optical lens includes dipping the lens in a solution which adheres to one or both surfaces of the lens upon removal of the lens from the solution and then curing the solution to form the coating. Another method of applying an optical coating to an optical lens involves applying the coating to one or both surfaces of the lens using a physical vapor deposition (PVD) process.

In some applications, it may be necessary or desirable to sequentially apply multiple layered coatings to one or both surfaces of an optical lens. For example, application of optical coatings to one or both surfaces of optical lenses for eyewear may include application of metallic, dielectric, dichroic, hydrophobic, oleophobic or super hydrophobic coatings to the lenses in a sequential manner. One challenge, which is inherent in the serial application of coatings to optical lenses, is the transfer of each lens among multiple deposition chambers in a manner which is both efficient and does not risk physical contact or contamination of the freshly-applied coatings on the lens.

Substrate deposition systems which facilitate sequential application of coatings to an optical lens or other substrate are therefore needed.

SUMMARY OF THE INVENTION

Illustrative embodiments of the disclosure are generally directed to a substrate deposition system. An illustrative embodiment of the substrate deposition system includes a system frame; a plurality of processing tanks carried by the system frame, the plurality of processing tanks adapted to contain liquid coating materials of different light refractive indexes; at least one actuator disposed in proximity to the plurality of processing tanks, at least one actuator adapted to sequentially immerse at least one substrate in the liquid coating materials and transfer at least one substrate between the plurality of processing tanks; and at least one coating system located in a process flow downstream direction from the plurality of processing tanks, at least one coating system adapted to apply an antireflective coating to the at least one substrate.

Illustrative embodiments of the disclosure are further generally directed to a lens surface location measuring system for a substrate deposition system having a deposition source. An illustrative embodiment of the lens surface location measuring system includes a sensor support frame, the sensor support frame adapted to support at least one substrate in the substrate deposition system and at least one sensor assembly carried by the sensor support frame, the at least one sensor assembly including a lens surface location measuring sensor adapted to measure the location of a surface of the substrate relative to the deposition source.

BRIEF DESCRIPTION OF THE DRAWINGS

The disclosure will now be made, by way of example, with reference to the accompanying drawings, in which:

FIG. 7 is a front view of an exemplary lens surface location measuring system which is suitable for implementation of an illustrative embodiment of the vapor deposition system illustrated in FIGS. 1-5;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 2:
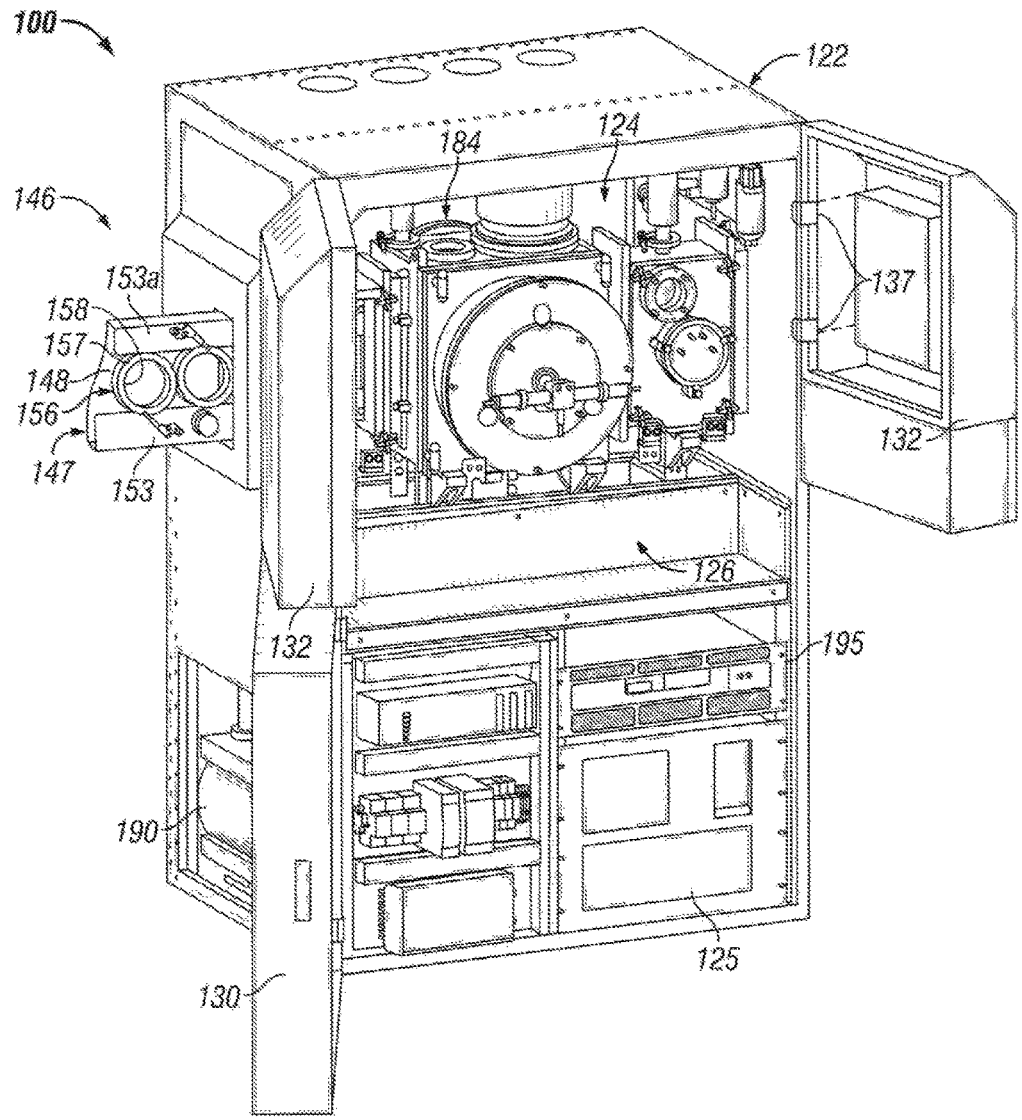
FIG. 2 is a right side front perspective view of an illustrative embodiment of the vapor deposition system, with the system housing in an open configuration.
Figure 3:
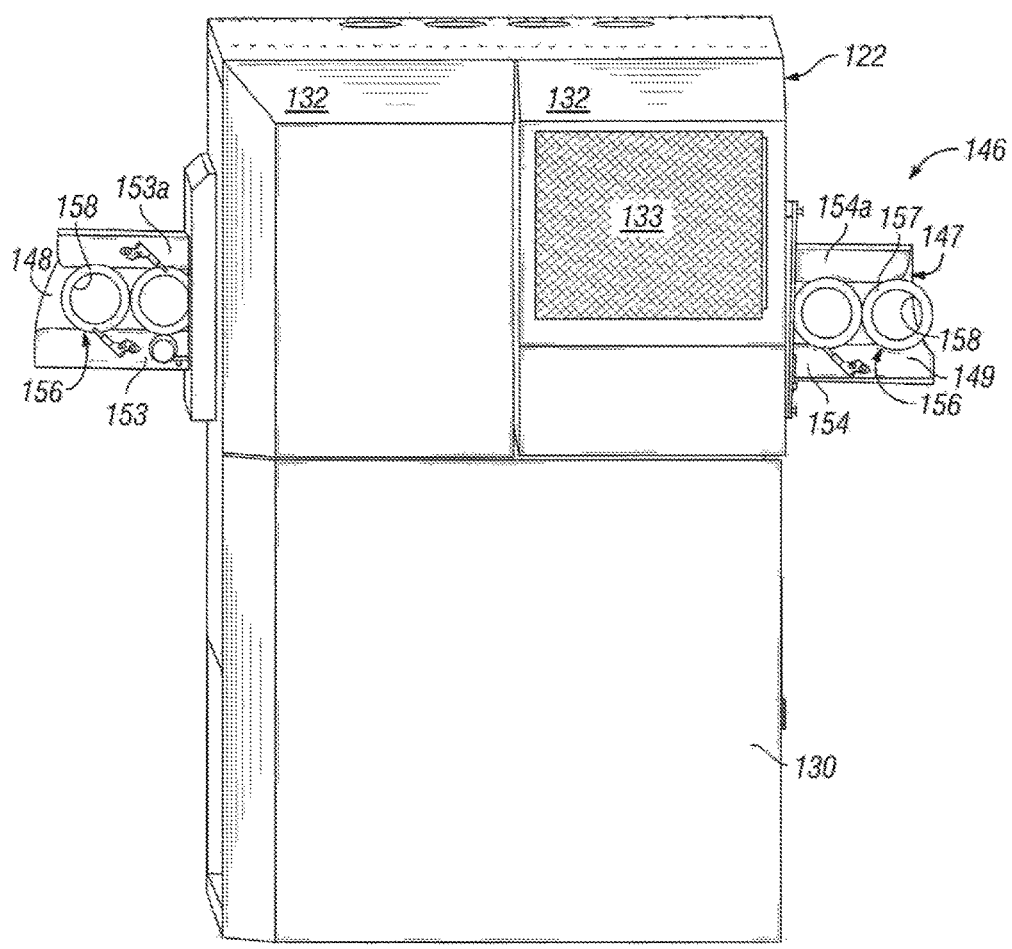
FIG. 3 is a perspective view of an illustrative embodiment of the vapor deposition system, with the system housing in a closed configuration.
Figure 4:
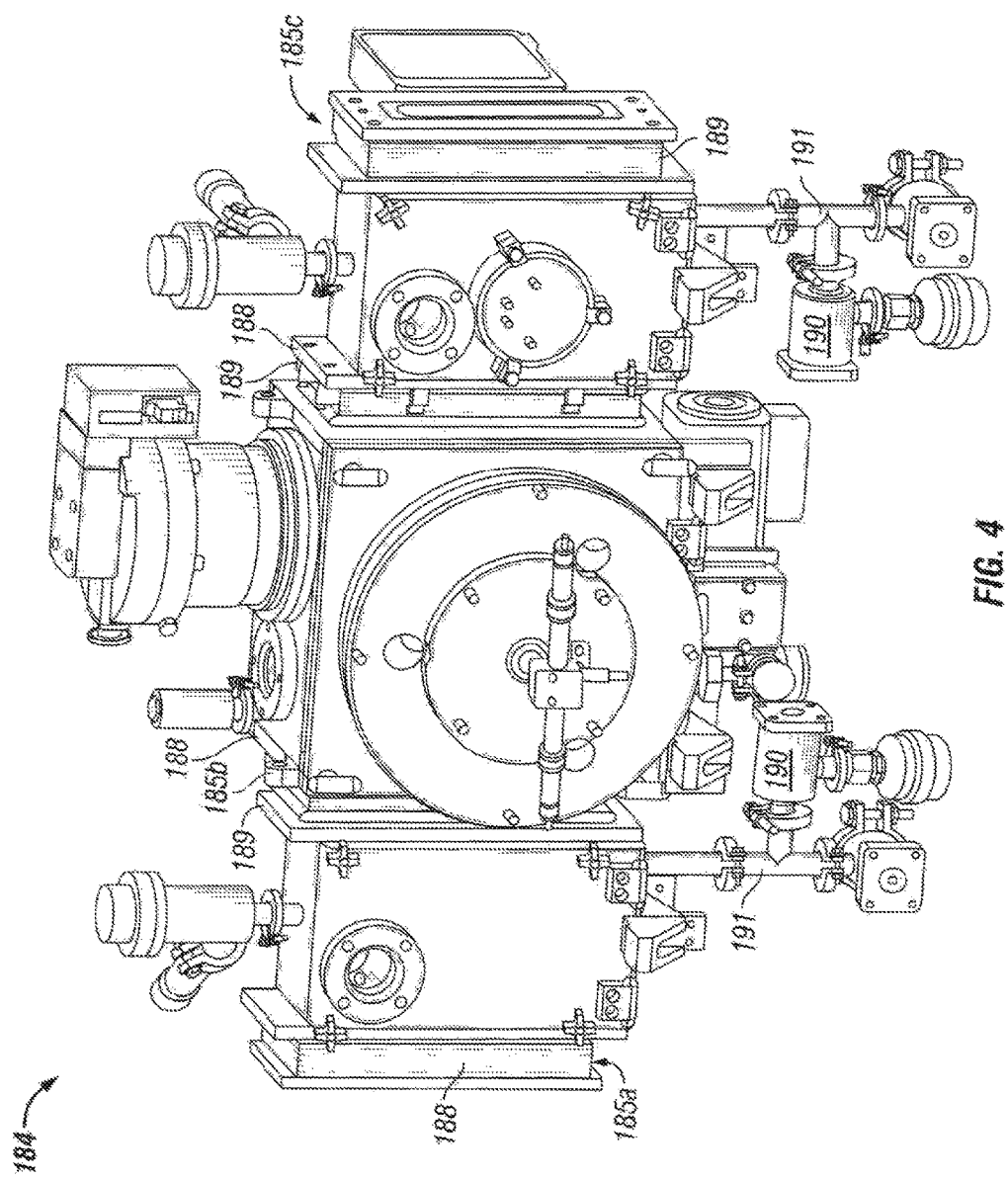
FIG. 4 is a perspective view of a film application system of an illustrative embodiment of the vapor deposition system.

Referring initially to FIGS. 1-4 of the drawings, an illustrative embodiment of the physical vapor deposition system, hereinafter system, is generally indicated by reference numeral 100. As will be hereinafter further described, the system 100 is adapted to sequentially apply one or more coatings (not illustrated) on one or both surfaces (not illustrated) of a substrate (not illustrated) using a physical vapor deposition (PVD) process. In some applications, the substrate may be an optical lens of eyewear such as eyeglasses or sunglasses, for example and without limitation. The coating(s) which is/are applied to the substrate may be hydrophobic, oleophobic or super hydrophobic coatings, for example and without limitation, which may serve as anti-reflective coatings, high-reflective coatings or other optical coatings known in the art. The PVD processes which are used to apply the coatings to the substrate may be sequentially carried out in a series of multiple processing chambers 185 (FIG. 4). Each substrate may be transferred from one processing chamber 185 to the next processing chamber 185 in the deposition process via gravity, as will be hereinafter further described.

The system 100 may include a system housing 122. In some embodiments, the system housing 122 may include a pair of side housing panels 123, a top housing panel 127 and a rear housing panel 128 which define a housing interior 124. The housing interior 124 may be divided into a lower subsystem compartment 125 and an upper chamber compartment 126. The subsystem compartment 125 may contain various subsystem components of the system 100 which will be hereinafter described. The chamber compartment 126 may contain a film application system 184 having multiple processing chambers 185. In operation of the system 100, which will be hereinafter described, the processing chambers 185 implement etching and physical vapor deposition functions in the processing of substrates.

Figure 1:
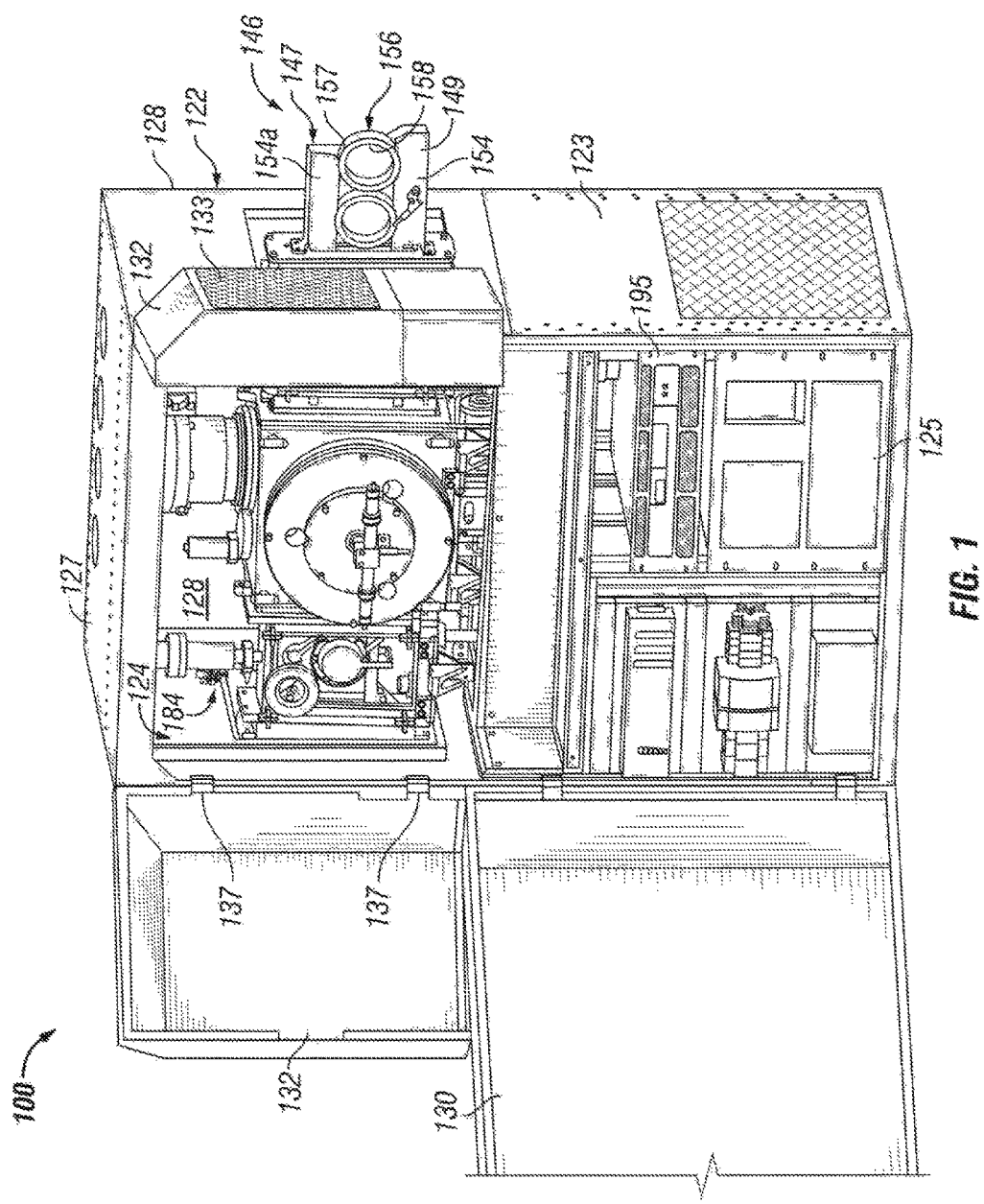
FIG. 1 is a left side front perspective view of an illustrative embodiment of the vapor deposition system, with the system housing in an open configuration.

As illustrated in FIGS. 1-4, the system housing 122 may include at least one front subsystem compartment door 130 provided on the system frame 101. In some embodiments, the system housing 122 may have multiple, adjacent front subsystem compartment doors 130. The front subsystem compartment doors 130 may be selectively opened to expose the subsystem compartment 125 at the front portion of the housing interior 124, as illustrated in FIGS. 1 and 2, or selectively closed to conceal the subsystem compartment 125 at the front portion of the housing interior 124, as illustrated in FIG. 3.

In some embodiments, the system housing 122 may further include at least one rear subsystem compartment door (not illustrated) provided on the system housing 122. The rear subsystem compartment door may be selectively opened to expose the subsystem compartment 125 at the rear portion of the housing interior 124 or selectively closed to conceal the subsystem compartment 125 at the rear portion of the housing interior 124.

The system housing 122 may include at least one front chamber compartment door 132 to selectively expose and conceal the chamber compartment 126 at the front portion of the housing interior 124. At least one of the front chamber compartment doors 132 may have at least one window 133. In some embodiments, the front chamber compartment door 132 may be pivotally attached to a side housing panel 123 of the system housing 122 via door hinges 137 (FIGS. 1 and 2). At least one door latch (not illustrated) may be provided on each front chamber compartment door 132. The door latch or latches may be adapted to selectively lock the front chamber compartment door or doors 132 in the closed position of FIG. 3 or selectively unlock the front chamber compartment door or doors 132 for opening as illustrated in FIGS. 1 and 2. In some embodiments, at least one door extension cylinder (not illustrated) may be attached to the system housing 122. A door extension piston (not illustrated) may be extendable from the door extension cylinder. The door extension piston may be attached to an interior surface of the front chamber compartment door 132. Accordingly, when the front chamber compartment door 132 is closed and the door latch (not illustrated) is latched, the door extension piston is retracted into the door extension cylinder. When the front chamber compartment door 132 is open, the door extension piston extends from the door extension cylinder and maintains the front chamber compartment door 132 in the open position.

In some embodiments, the system housing 122 may further include a rear chamber compartment door (not illustrated) to selectively expose and conceal the chamber compartment 126 at the rear portion of the housing interior 124. The rear chamber compartment door may have a design and attachment which are as were heretofore described with respect to the front chamber compartment door or doors 132.

As further illustrated in FIGS. 1-9, the system 100 may include a fixture transfer assembly 146. The fixture transfer assembly 146 may include a generally elongated fixture transfer rail 147 which extends transversely through the chamber compartment 126 of the housing interior 124 in the system housing 122. The fixture transfer rail 147 may have a fixture loading end 148 and a fixture unloading end 149. A lower loading ramp segment 153 and an upper loading ramp segment 153a, and a lower unloading ramp segment 154 and an upper unloading ramp segment 154a, of the fixture transfer rail 147 may protrude beyond the respective loading and unloading ends, respectively, of the system housing 122. The fixture transfer rail 147 may generally slope downwardly from the fixture loading end 148 to the fixture unloading end 149.

The fixture transfer rail 147 of the fixture transfer assembly 146 may be mounted in the chamber compartment 126 of the housing interior 124 according to any suitable technique which is known by those skilled in the art. In some embodiments, the fixture transfer assembly 146 may include a generally elongated chamber support member (not illustrated) which extends through the chamber compartment 126 in generally transverse relationship to the longitudinal axis of the system housing 122. The chamber support member may be attached to any structural component of the system housing 122 using welding, fasteners and/or other suitable attachment technique. The fixture transfer rail 147 may be sloped with respect to the horizontal at a slope angle of about 91. 50 degrees.

As illustrated in FIGS. 1-3, the fixture transfer assembly 146 may further include at least one fixture carrier assembly 156. In some embodiments, the fixture transfer assembly 146 may include multiple fixture carrier assemblies 156, as illustrated. Each fixture carrier assembly 156 may include an annular assembly frame 157 having a frame opening 158. A fixture mount plate (not illustrated) having a fixture opening may be provided in the frame opening 158. The fixture opening is sized and configured to receive and secure a single substrate (not illustrated) typically in the conventional manner.

Figure 5:
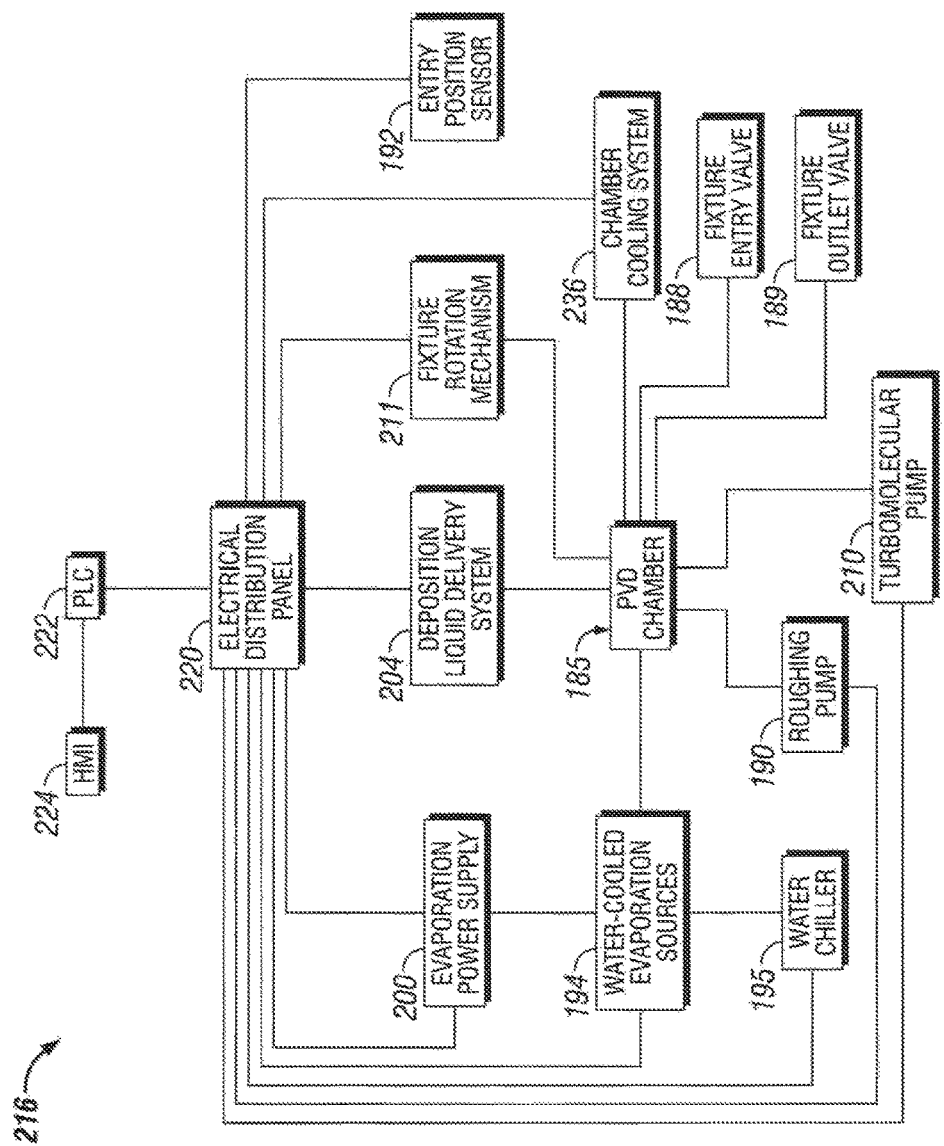
FIG. 5 is a block diagram which illustrates interconnection of the various subsystem components of the physical vapor deposition system.

As illustrated in FIGS. 1 and 2 of the drawings, a film application system 184 having multiple processing chambers 185 (FIG. 4) is provided in the chamber compartment 126 of the housing interior 124. The processing chambers 185 have physical vapor deposition capabilities according to the knowledge of those skilled in the art. At least one of the processing chambers 185 may have substrate etching capabilities. As illustrated in FIG. 5, in some embodiments, the processing chambers 185 may include a first processing chamber 185a, a second processing chamber 185b and a third processing chamber 185c which are sequentially ordered between the lower and upper loading ramp segments 153, 153a on one side and the lower and upper unloading ramp segments 154, 154a on the other side of the system housing 122. The processing chambers 185 may therefore assume the sloped or angled orientation of the fixture transfer rail 147.

Each processing chamber 185 is adapted to receive by gravity and contain a fixture carrier assembly 156 having a substrate (not illustrated) retained therein for processing of the substrate. As illustrated in FIG. 4, a fixture entry valve 188 may be disposed in fluid communication with each processing chamber 185 at an inlet side of the processing chamber 185. A fixture outlet valve 189 may be disposed in fluid communication with the processing chamber 185 at an outlet side of the processing chamber 185. The fixture entry valves 188 and the fixture outlet valves 189 may couple the first processing chamber 185a to the second processing chamber 185b and the second processing chamber 185b to the third processing chamber 185c with a vacuum-tight seal in the chamber compartment 126 of the housing interior 124. In operation of the system 100, which will be hereinafter further described, the fixture entry valve 188 and the fixture outlet valve 189 may facilitate sequential transfer of each of multiple fixture carrier assemblies 156 into and out of, respectively, each processing chamber 185.

As further illustrated in FIG. 4, the film applicator system 184 may include a roughing pump 190 which is disposed in fluid communication with each processing chamber 185 through a roughing pump conduit 191. Multiple water-cooled evaporation sources (not illustrated) may be provided in each processing chamber 185. A water chiller (not illustrated) may be connected to the water-cooled evaporation sources through a pair of water hoses. An evaporation power supply (not illustrated) may be electrically connected to the water-cooled evaporation sources through a pair of power cables.

At least one liquid delivery injection arm (not illustrated) may be disposed in fluid communication with each processing chamber 185. In some embodiments, a pair of front and rear liquid delivery injection arms may be disposed in fluid communication with each processing chamber 185. An arm internalization mechanism (not illustrated) may engage each liquid delivery injection arm for internalization of the liquid delivery injection arms through respective front and back side liquid delivery ports (not illustrated) into the processing chamber 185 in operation of the system 100. When in the internalized configuration, the liquid delivery injection arms may be positioned on opposite front and back sides of the fixture carrier assembly 156. A deposition liquid delivery system (not illustrated) may be disposed in fluid communication with the liquid delivery injector arms through liquid delivery lines.

A turbomolecular pump (not illustrated) may be disposed in fluid communication with each processing chamber 185. Each processing chamber 185 may include a fixture rotation mechanism (not illustrated) which facilitates rotation of the fixture carrier assembly 156 in the processing chamber 185. The fixture rotation mechanism may include a movement sensor (not illustrated) which senses movement of the fixture carrier assembly 156 in the processing chamber 185. A vacuum valve (not illustrated) may be disposed in fluid communication with the processing chamber 185 in communication with the turbomolecular pump.

It will be recognized and understood that the foregoing description of each processing chamber 185 is a general description and it will be recognized and understood that processing chambers of various design which are known by those skilled in the art may be suitable for the purpose of etching and depositing coatings on substrates using physical vapor deposition techniques in operation of the system 100. Some processing chambers 185 which are suitable for implementation of the system 100 may depart in at least some design details from the foregoing description of the processing chamber 185 which was set forth herein above with respect to FIG. 4. At least one of the processing chambers 185 may have any etching chamber design with necessary hardware which is suitable for etching and cleaning of the substrates preparatory to deposition of coatings on the substrates by operation of the processing chambers 185. Etching chamber designs are well-known by those skilled in the art; therefore, the hardware and design of the etching chamber 198 need not be set forth herein in detail. Generally, the etching chamber may include a fixture entry valve 188 and a fixture outlet valve 189 which facilitate entry and exit of individual fixture carrier assemblies 156 into and out of, respectively, the etching chamber, as was heretofore described with respect to the processing chambers 185 in FIG. 4.

Referring next to FIG. 5 of the drawings, a block diagram of a control system 216 which is suitable for implementation of the physical vapor deposition system 100 is illustrated. The control system 216 may include a programmable logic controller (PLC) 222. A human-machine interface (HMI) 224 may interface with the PLC 222. The HMI 224 may include a keyboard, mouse and/or other elements which may be used to program the PLC 222 to operate the multiple functions of the system 100. An electrical distribution panel 220 may interface with the PLC 222. The various functional components of the system 100 may be electrically connected to the electrical distribution panel 220. Accordingly, the PLC 222 may be adapted to operate the various subsystems of the system 200 through the electrical distribution panel 220.

Some of the subsystems of the system 100 may include a roughing pump 190, water-cooled evaporation sources 194, a deposition liquid delivery system 204, a fixture rotation mechanism 211, a fixture entry valve 188, a fixture outlet valve 189 and a turbomolecular pump 210, each of which is disposed inside or interfaces with the processing chamber 185. The evaporation power supply 200 may be electrically connected to the electrical distribution panel 220 and the water-cooled evaporation sources 194 in the processing chamber 185. The water chiller 195 may be electrically connected to the electrical distribution panel 220 and disposed in fluid communication with the water-cooled evaporation sources 194. In some embodiments, an entry position sensor 192 may be connected to the electrical distribution panel 220 and disposed at the entry position of the processing chamber 185 adjacent to the fixture entry valve 188. The entry position sensor 192 may be adapted to sense the fixture carrier assembly 156 at the entry position of the processing chamber 185 and enable the PLC 222 to open the fixture entry valve 188 of the processing chamber 185 for entry of the fixture carrier assembly 156 into the processing chamber 185, as will be hereinafter described. As further illustrated in FIG. 5, in some embodiments, a chamber cooling system 236 may interface with each processing chamber 185 and the electrical distribution panel 220 for the purpose of cooling the interior of the processing chamber 185.

Some of the subsystems of the system 100 may be contained in the subsystem compartment 125 (FIGS. 1 and 2) of the housing interior 124. In some embodiments, the roughing pumps 190, the water chiller 195 and the evaporation power supply 200 may be contained in the subsystem compartment 125 in the front portion of the housing interior 124. The electrical distribution panel 220 and the PLC 222 may be contained in the subsystem compartment 125 in the rear portion of the housing interior 124. The subsystems can be selectively exposed and accessed for repair, replacement and/or maintenance purposes by opening the front subsystem compartment doors 130 (FIG. 1) and the rear subsystem compartment door (not illustrated). Likewise, the PVD chambers 185 can be selectively exposed and accessed for repair, replacement and/or maintenance purposes by opening the front chamber compartment door 132 and the rear chamber compartment door (not illustrated).

In exemplary application, the system 100 is operated to apply one or multiple coatings (not illustrated) to one or both sides of a substrate (not illustrated) in a sequential manner using a physical vapor deposition (PVD) process. In some applications, the substrate may be an optical lens which will be used in the assembly of eyewear such as eyeglasses or sunglasses, for example and without limitation. For example and without limitation, in some applications, the system 100 may be operated to plasma etch the front and backsides of an optic lens; apply a mirror coating to the front of the lens; and apply an oleophobic/hydrophobic coating to the front and backside of the lens. In other applications, the substrate may be any type of substrate to which one or more coatings is to be applied using a PVD process.

A substrate is secured in each of multiple fixture carrier assemblies 156 (FIGS. 1-3). As will be hereinafter further described, each fixture carrier assembly 156 serves as a vehicle for transport of the substrate between and within the sequential processing chambers 185. Accordingly, each substrate may initially be secured in the frame opening 158 of a corresponding fixture carrier assembly 156.

As illustrated in FIGS. 2 and 3, at least one fixture carrier assembly 156 (each containing a substrate 182 held therein) is initially placed on the lower loading ramp segment 153 of the fixture transfer rail 147. In some embodiments, multiple fixture carrier assemblies 156 may be placed in series on the lower loading ramp segment 153 of the fixture transfer rail 147, as illustrated. Each fixture carrier assembly 156 may be inserted in place between the lower loading ramp segment 153 and the upper loading ramp segment 153*a* such that a circumferential rail groove (not illustrated) in the assembly frame 157 of the fixture carrier assembly 156 receives the lower loading ramp segment 153 and the upper loading ramp segment 153*a* of the fixture transfer rail 147. Each fixture carrier assembly 156 is therefore self-standing between the lower loading ramp segment 153 and the upper loading ramp segment 153*a*.

Due to the angled or sloped configuration of the lower loading ramp segment 153 and the upper loading ramp segment 153*a*, each fixture carrier assembly 156 has a tendency to roll under influence of gravity on the fixture transfer rail 147 from the fixture loading end 148 toward the fixture unloading end 149 thereof. Accordingly, the fixture carrier assembly 156 which is first in the series of multiple fixture carrier assemblies 156 on the loading ramp segment 153 rolls to a "ready" position adjacent to a fixture entry valve 188 at the inlet of the first processing chamber 185*a*. A second fixture carrier assembly 156 rolls into the space which was previously occupied by the first fixture carrier assembly 156, and the remaining fixture carrier assemblies 156 roll into the spaces previously occupied by the preceding fixture carrier assemblies 156, respectively.

The system 100 is initialized and enters a standby condition as the PLC 222 (FIG. 5) is turned on. The operational parameters (temperature, pressure, etc.) for the etching process which is to be carried out and for each of the deposition processes which are to be sequentially carried out in the processing chambers 185 may be programmed into the PLC 222 (FIG. 5) through the HMI 224. An entry position sensor (not illustrated) at the "ready" position adjacent to the fixture entry valve 188 of the first processing chamber 185*a* senses the location of the first fixture carrier assembly 156 at the "ready" position and transmits a signal to the PLC 222. In response, the PLC 222 opens the fixture entry valve 188 of the first processing chamber 185*a* and the first fixture carrier assembly 156 rolls into the first processing chamber 185*a*. The PLC 222 then closes the fixture entry valve 188 of the first processing chamber 185*a* and establishes the programmed pressure in the first processing chamber 185*a*. The next fixture carrier assembly 156 in line on the unloading ramp segment 154 rolls on the fixture transfer rail 147 under the influence of gravity into the "ready" position next to the fixture entry valve 188 of the first processing chamber 185.

After the PLC 222 establishes the etching temperature, pressure and other operational parameters which were pre-programmed into the PLC 222, the first processing chamber 185*a*, under control by the PLC 222, may operate to etch and clean both surfaces of each substrate which is held in the first fixture carrier assembly 156. After etching and cleaning of the substrates in the first fixture carrier assembly 156 is completed, the PLC 222 opens a fixture outlet valve 189 of the first processing chamber 185 and the first fixture carrier assembly 156 rolls from the first processing chamber 185 into the entry position of the second processing chamber 185*b*. The entry position sensor 192 (FIG. 5) senses that the first fixture carrier assembly 156 is at the entry position of the second processing chamber 185*b* and transmits a signal to the PLC 222 indicating the entry position of the first fixture carrier assembly 156. In response, the PLC 222 vents the first processing chamber 185*a* to atmosphere and then opens the fixture entry valve 188 of the second processing chamber 185*b*. Simultaneously, the front and back side liquid delivery ports (not illustrated) of the second processing chamber 185*b* are opened and the front and rear liquid delivery injector arms (not illustrated), under actuation by the arm internalization mechanisms (not illustrated), descend into the second processing chamber 185*b*. The first fixture carrier assembly 156 rolls into place in the second processing chamber 185*b*. The PLC 222 then closes the fixture entry valve 188. The PLC 222, responsive to input from the entry sensor (not illustrated) at the "ready" position of the first processing chamber 185*a*, opens the fixture entry valve (not illustrated) of the first processing chamber 185*a* and the fixture carrier assembly 156 which was next in line behind the first fixture carrier assembly 156 rolls on the fixture transfer rail 147 into the first processing chamber 185*a*.

The deposition liquid (not illustrated) which will form the coatings on one or both surfaces of each substrate in the first fixture carrier assembly 156 is dispensed from the deposition liquid delivery system 204 (FIG. 5) through the respective liquid delivery lines (not illustrated) to the liquid delivery injector arms (not illustrated). The liquid delivery injector arms dispense the deposition liquid into the water-cooled evaporation sources 194 (FIG. 5) in the second processing chamber 185*b*. Once the deposition liquid is fully dispensed into the evaporation sources 194, the liquid delivery injector arms are retracted from the second processing chamber 185*b* and the liquid delivery ports (not illustrated) are closed. Next, the fixture rotation mechanism 211 (FIG. 5) may rotate the first fixture carrier assembly 156 in the second processing chamber 185*b* and the PLC 222 pulls vacuum on the second processing chamber 185*b* via the roughing pump 190 and the turbomolecular pump. Once the correct level of vacuum pressure in the second processing chamber 185*b* has been achieved, the deposition liquid in the evaporation sources 194 is evaporated into the second processing chamber 185*b*, coating the substrate in the first fixture carrier assembly 156. After it determines that a predetermined period of time has elapsed to ensure thorough coating of the substrates, the PLC 222 vents the second processing chamber 185*b* to atmosphere. The PLC 222 then opens the fixture outlet valve 189 of the second processing chamber 185*b* such that the first fixture carrier assembly 156 rolls under influence of gravity the second processing chamber 185*b* to the fixture entry position of the third processing chamber 185*c*. The same PVD and transfer process is then carried out on the substrates of the first fixture carrier assembly 156 in the third processing chamber 185*d* until the desired coatings have been sequentially applied to the surfaces of each substrate. As the PVD process is carried out in the second processing chamber 185*b*, the substrates held in the fixture carrier assembly 156 which was next in line behind the first fixture carrier assembly 156 may be etched in the first processing chamber 185*a*. The substrates in that next-in-line fixture carrier assembly 156 may then be subjected to the PVD processes in the second processing chamber 185*b* and the third processing chamber 185*c* in the same manner as the substrates in the first fixture carrier assembly 156.

After the PVD processes in the third processing chamber 185*c* are completed, the fixture carrier assemblies 156 sequentially roll from the third processing chamber 185*c* onto the unloading ramp segment 154 of the fixture transfer rail 147. The fixture carrier assemblies 156 are removed from the unloading ramp segment 154 and the substrates are removed from the frame openings 158 in the fixture carrier assemblies 156 for further processing. Between uses of the system 100, the PLC 222 may periodically operate the chamber cooling system 236 (FIG. 5) to clean the interior of each processing chamber 185 as deemed necessary.

It will be appreciated by those skilled in the art that the physical vapor deposition system 100 is capable of processing substrates in multiple fixture carrier assemblies 156 at the same time by simultaneous operation of the processing chambers 185. This expedient facilitates high-speed, low-volume and high-throughput production of thin film-coated substrates using physical vapor deposition processes. Moreover, transfer of the fixture carrier assemblies 156 between the processing chambers 185 by gravity eliminates the need for mechanical structure and related power supply which would otherwise be required for the transfer operation. The system 100 may be designed such that the chamber functions and capabilities are flexible and can be adapted for various types of physical vapor deposition applications on different types of substrates. Examples include but are not limited to ophthalmic mirror coatings, ophthalmic anti-reflective coatings, protective coatings, cosmetic coatings, compact disc manufacturing and medical device manufacturing. The construction methods and materials for the system 100 may be tailored according to the particular thin films which are to be applied to the substrates. The system 100 may be constructed in any of various sizes depending on the desired application. Various alternative designs for the subsystems, assemblies and components may be used in various embodiments of the system 100. The system 100 may be fabricated using a variety of fabrication techniques including but not limited to welding, brazing, connectors, terminal blocks, screws, bolts, nuts and clamps.

It will be further appreciated by those skilled in the art that each processing chamber 185 may contain multiple water-cooled evaporation sources 194 (FIG. 5) to enhance the flexibility of the physical vapor deposition system 100. Thus, multiple types of physical vapor deposition by evaporation processes can be carried out in each processing chamber 185. The system housing 122 may be fabricated with a small footprint to facilitate ease and space efficiency in placement of the physical vapor deposition system 100 in retail locations.

Various structural provisions instead of or in addition to those which were heretofore described with respect to the drawings may be made for the functioning and distribution of the vacuum subsystem, pneumatic subsystem, electrical subsystem and/or any other subsystems or components which may be deemed necessary for operation of the processing chambers 185 or any other operational component or subsystem of the system 100. For example and without limitation, vacuum system conduits (not illustrated) may be routed throughout the housing interior 124 to provide connection between the roughing pumps 190, turbomolecular pumps and/or other pumps and the processing chambers 185. Pneumatic system conduits (not illustrated) may provide connection between vacuum subsystem components or pneumatic subsystem components and the processing chambers 185. Pneumatic system ports (not illustrated) may be provided in the fixture transfer rail 147 and/or other structural components of the system 100 for functioning of the pneumatic subsystem. Other structural provisions may include whichever supports, wiring and plumbing may be necessary to interconnect all components and subsystems.

The film applicator system 184 (FIG. 17) of the system 100 may be designed as a stand-alone unit, as part of an in-line physical vapor deposition system or as part of a larger, more complex system. The film applicator system 184 can coat one side or two sides of a substrate and a two-sided coating applied to the substrate may be performed individually or simultaneously at high speeds and high throughput. The film applicator system 184 may be operated manually, semi-automatically or fully automatically via a computer or the PLC 222 and HMI 224 (FIG. 5).

The fixture carrier assemblies 156 may be constructed of various materials depending on the particular application. The fixture carrier assemblies 156 may be constructed for single-side application and may be fabricated in various sizes. Alternative methods of holding the substrate in the frame opening 158 of each fixture carrier assembly 156 may be used. Moreover, the design of each fixture carrier assembly 156, as well as each processing chamber 185 as described and illustrated herein, may facilitate uniform coating of either or both surfaces of each substrate depending on the desired application.

Figure 6:
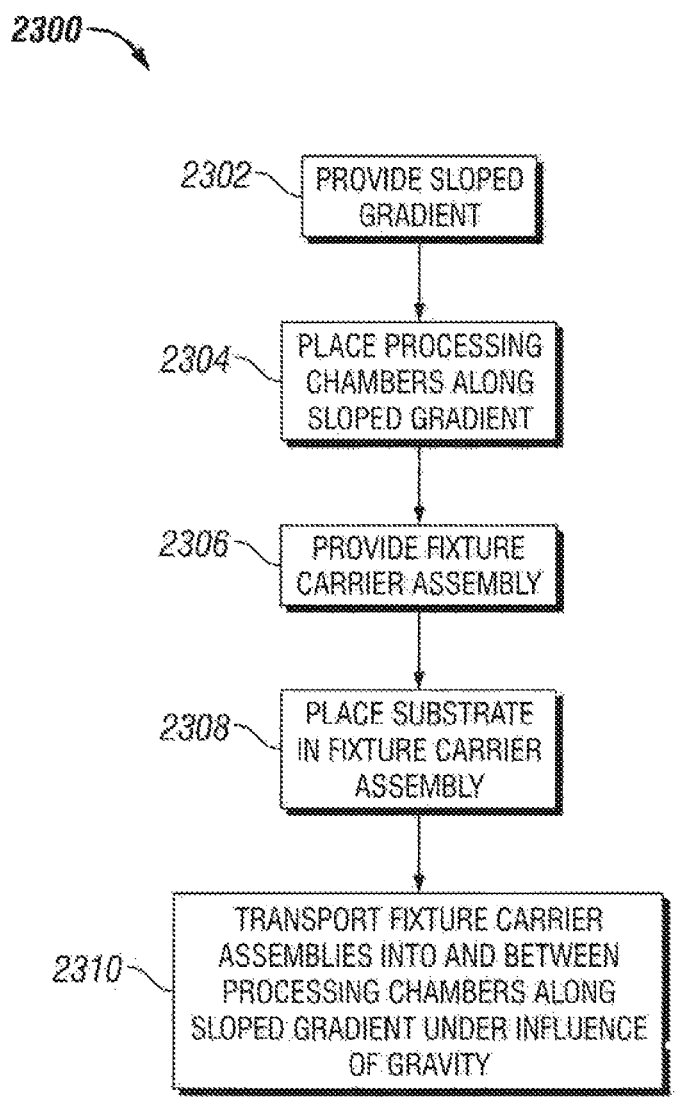
FIG. 6 is a flow diagram of an illustrative embodiment of a physical vapor deposition method.

Referring next to FIG. 6 of the drawings, a flow diagram 2300 of an illustrative embodiment of a physical vapor deposition method is illustrated. In block 2302, a sloped gradient is provided. In block 2304, processing chambers are placed along the sloped gradient. In some applications, the processing chambers may include an etching chamber and at least one physical vapor deposition (PVD) chamber. In some embodiments, the processing chambers may include an etching chamber and multiple sequentially-ordered PVD chambers. In block 2306, at least one fixture carrier assembly is provided. In block 2308, a substrate is placed in the fixture carrier assembly. In block 2310, the fixture carrier assemblies are transported into and between the processing chambers along the sloped gradient under the influence of gravity. The design of each PVD chamber and each fixture carrier assembly may facilitate uniform deposition of one or more coatings on either or both surfaces of each substrate.

Figure 7A:
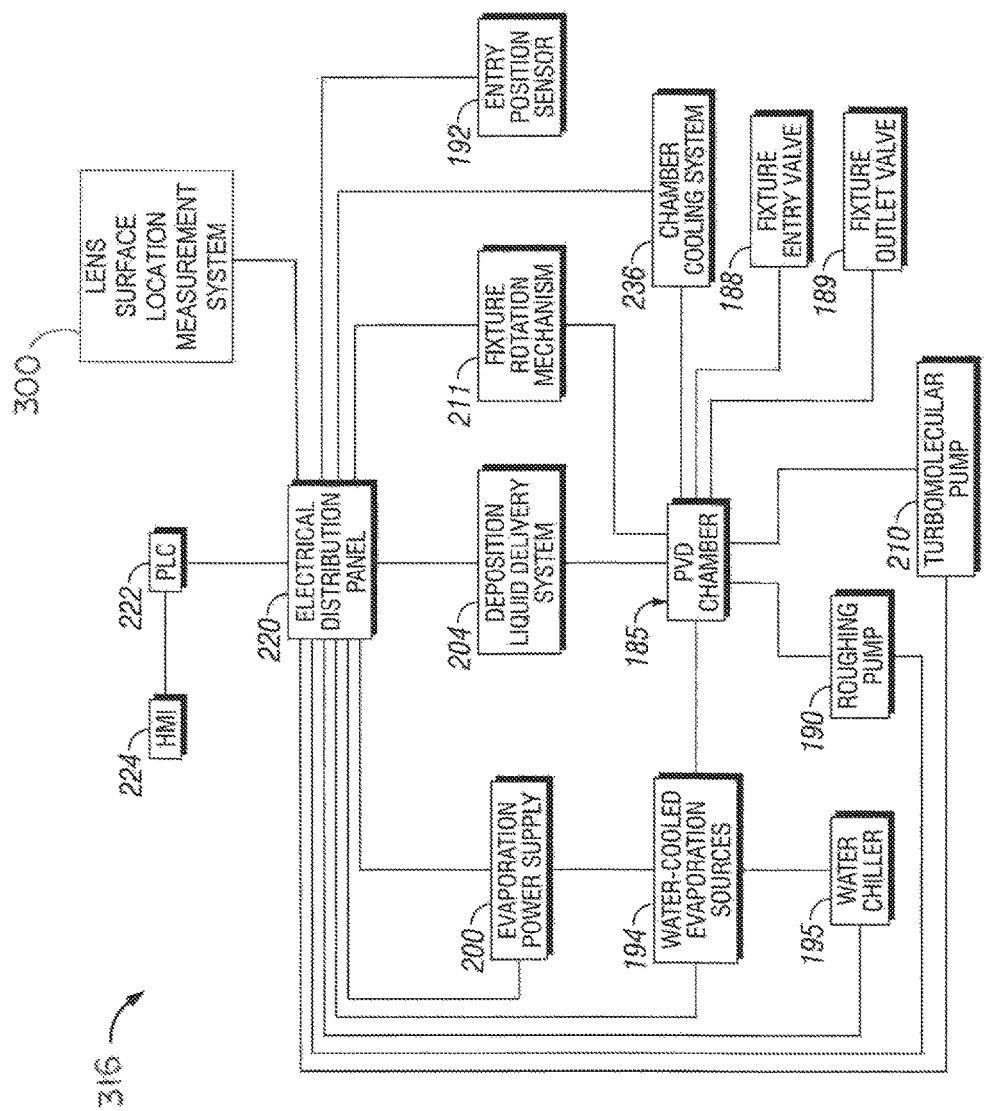
FIG. 7A is a block diagram which illustrates interconnection of the various subsystem components of the physical vapor deposition system which includes the lens surface location measuring system illustrated in FIG. 7.

Referring next to FIGS. 7 and 7A of the drawings, an exemplary substrate surface location measuring system 300 which is suitable for implementation of an illustrative embodiment of the vapor deposition system illustrated in FIGS. 1-5 is illustrated. The substrate surface location measuring system 300 may be suitable for measuring the location of a front surface 331 and the rear surface 332 of a substrate 330 with respect to a deposition source (not illustrated). In some applications, the substrate 330 may be an ophthalmic lens such as a contact lens or eyeglasses lens, for example and without limitation. Ophthalmic lenses are shaped different because of power, shape and other factors. Because of the manner in which the lenses are mounted in a conventional deposition system, therefore, the surface which is to be coated may not be located in the same position. The coating may therefore be excessively thick if the surface of the substrate is too close to the deposition source. Conversely, the further the substrate moves away from the deposition source, the thinner the coating. It is therefore necessary that the front surface 331 and the rear surface 332 of the substrate 330 relative to the deposition source be measured to ensure uniform deposition of the coatings on the substrate 303.

As illustrated in FIG. 7, the substrate surface location measuring system 300 may include a sensor support frame 301. The sensor support frame 301 may be adapted to be mounted in the support structure (not illustrated) of the vapor deposition system such as by, for example and without limitation, using frame mount brackets 302 and frame mount fasteners 303 according to the knowledge of those skilled in the art. A substrate space 306 may be provided in the sensor support frame 301. At least one fixture holder 326 may be provided in the substrate space 306. The fixture holders 326 may be adapted to hold and support a lens holding fixture (not illustrated) which holds the substrate 330 in the substrate space 306 in such a manner that the front surface 331 and the rear surface 332 of the substrate 330 are exposed.

A pair of sensor assemblies 310 may be supported by the sensor support frame 301. Each sensor assembly 310 may include a sensor mount bracket 311. In some embodiments, each sensor mount bracket 311 may be generally triangular with a bracket attachment portion 312, a sensor support portion 314 extending perpendicularly outwardly from the bracket attachment portion 312 and an angled bracket reinforcing portion 315 extending between the sensor support portion 314 and the bracket attachment portion 312. The bracket attachment portion 312 of each sensor mount bracket 311 may be attached to a corresponding side of the sensor support frame 301 such as by using bracket fasteners 313 and/or other suitable attachment technique known by those skilled in the art.

A lens surface location measuring sensor 320 is supported by the sensor mount bracket 311 of each sensor assembly 310. Each lens surface location measuring sensor 320 may be a contact or non-contact, physical or optical type sensor which has the capability to measure the location (such as x, y and z positions) of the substrate 330 relative to the deposition source (not illustrated) of the deposition system according to the knowledge of those skilled in the art. In some embodiments, each lens surface location measuring sensor 320 may include a sensor housing 321. A sensor handle 322 may extend from the sensor hosing 321. A sensor tip 323 may extend from the sensor housing 321. The sensor tips 323 of the respective lens surface location measuring sensors 320 may be located at opposite sides of the substrate space 306 in the sensor support frame 301. When the substrate 330 is disposed in the substrate space 306, as illustrated in FIG. 7, the sensor tips 323 of the respective lens surface location measuring sensors 320 may be located in proximity to the respective front surface 331 and rear surface 332 of the substrate 330.

In some applications, at least one lens surface location measurement system 300 may be included as a part of a physical vapor deposition system such as the physical vapor deposition system 100 that which was heretofore described with respect to FIGS. 1-5. As illustrated in FIG. 7A, the lens surface location measurement system 300 may interface with the electrical distribution control panel 220 of the physical vapor deposition system 100 for control using the PLC 222 through the HMI 224. In some applications, a separate lens surface location measurement system 300 may be located in each processing chamber 185 to measure and indicate the location of the substrate 330 relative to the film deposition or etching source (not illustrated) of each processing chamber 105. Accordingly, after it is transferred into the processing chamber 185, the substrate 330 may be positioned in the substrate space 306 with the lens surface location measuring sensors 320 positioned at or adjacent to the respective front surface 331 and rear surface 332 of the substrate 330. The lens surface location measuring sensors 320 determine the locations of the front surface 331 and the rear surface 332 relative to the film deposition or etching source, and may transmit this information to the PLC 222 via the electrical distribution panel 220. At the PLC 222, the operator of the physical vapor deposition system 100 may then operate the processing parameters of each processing chamber 185 according to the determined locations of the front surface 331 and the rear surface 332 relative to the film deposition and etching sources in the processing chamber 185 so that the coatings deposited on the front surface 331 and/or the rear surface 332 are the desired thickness, or the desired thickness of coating is etched from the front surface 331 and/or the rear surface 332 of the substrate 330. After processing in each processing chamber 185 is completed, the substrate 330 may be transferred to the next processing chamber 185 in the processing series and the process may be repeated.

It will be appreciated by those skilled in the art that the substrate surface location measuring system 300 provides feedback to the operator of the physical vapor deposition system 100 so the operator can adjust operation of each processing chamber and deposition or etching process on a per-substrate basis. The substrate surface location measuring system 300 may be applicable to any type of coating or deposition system that processes lenses or other substrates on an individual basis (single linear flow or the like).

Figure 8:
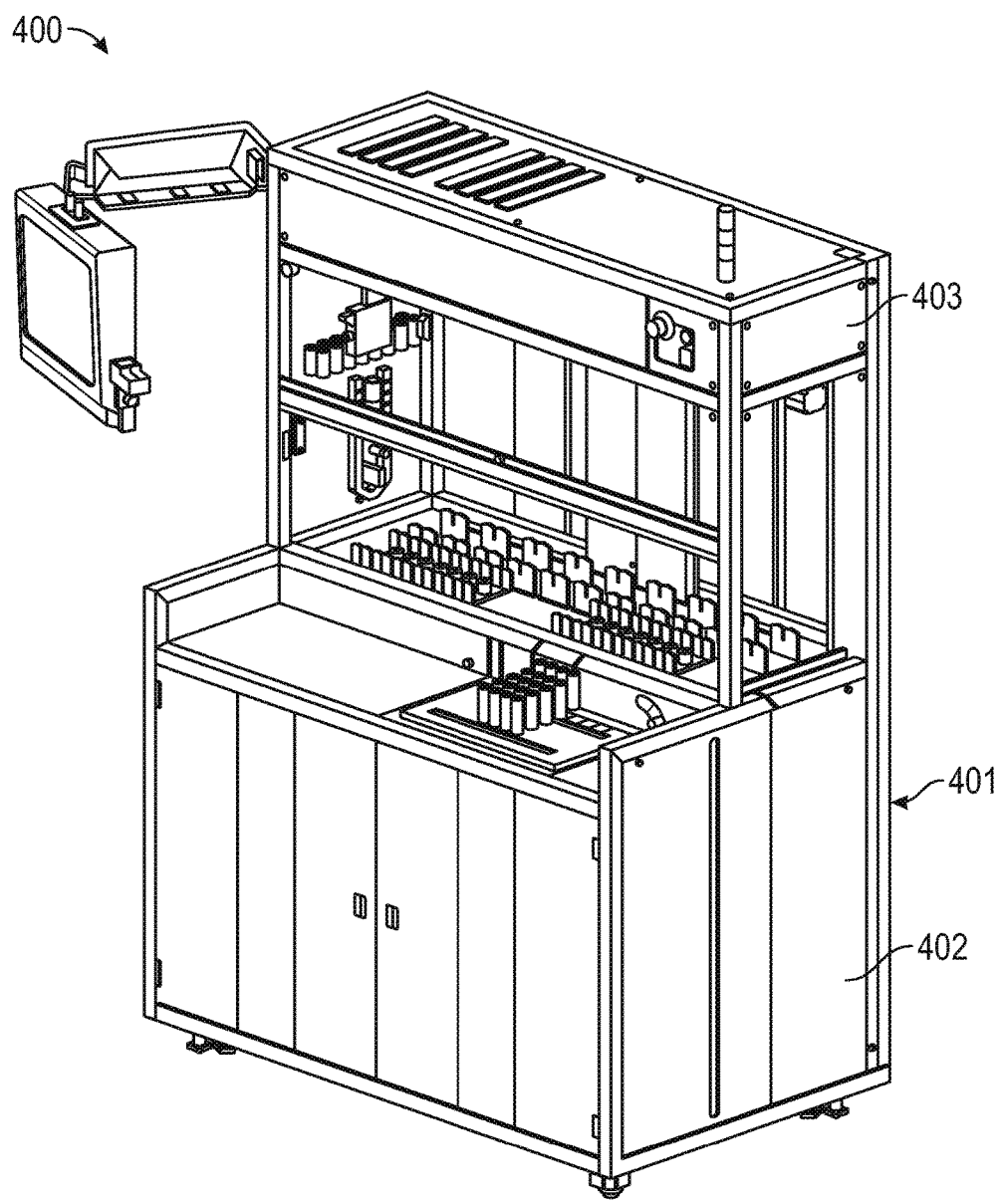
FIG. 8 is a front perspective view of an illustrative embodiment of a substrate deposition system.
Figure 9:
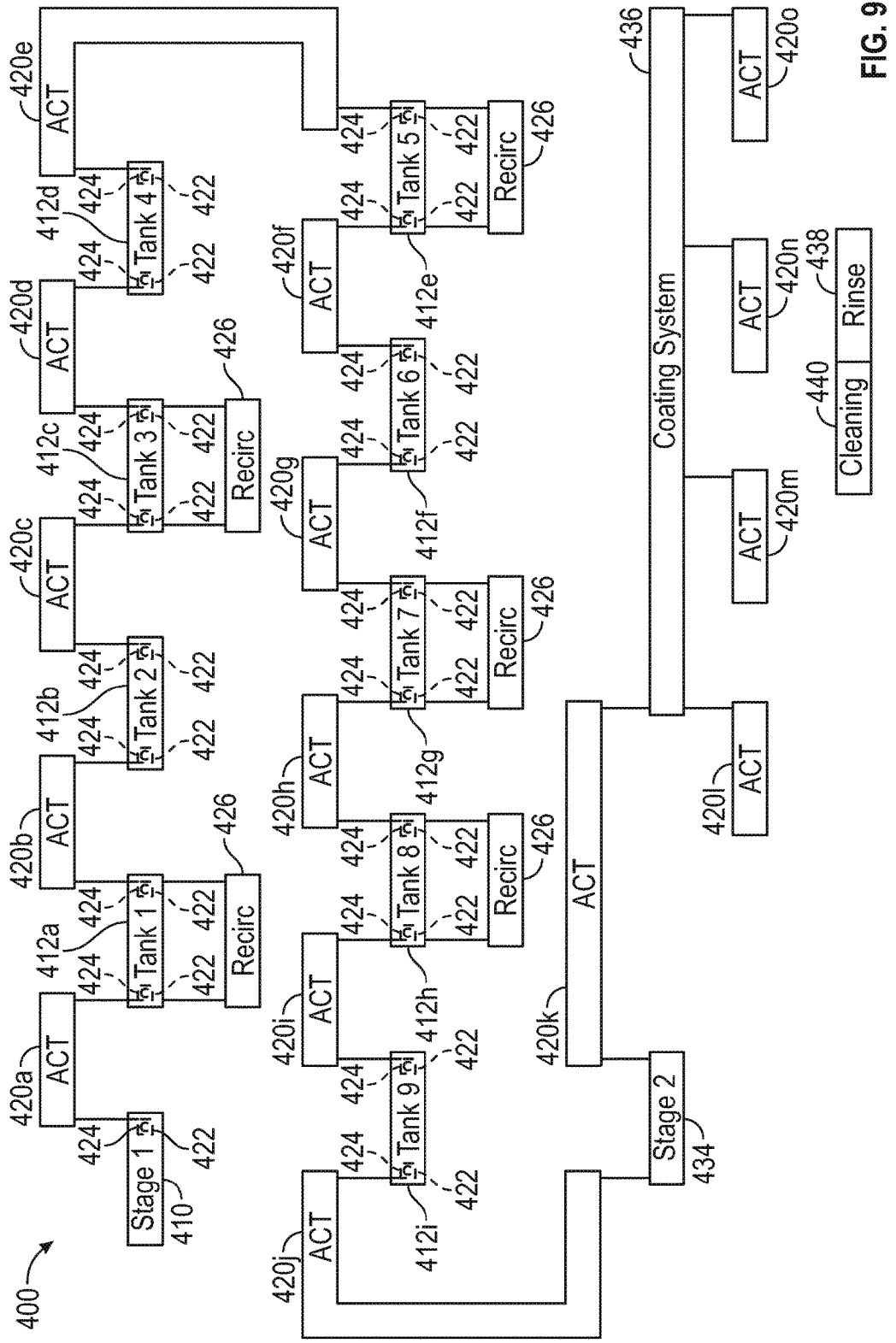
FIG. 9 is a functional block diagram of the substrate deposition system illustrated in FIG. 8.
Figure 10:
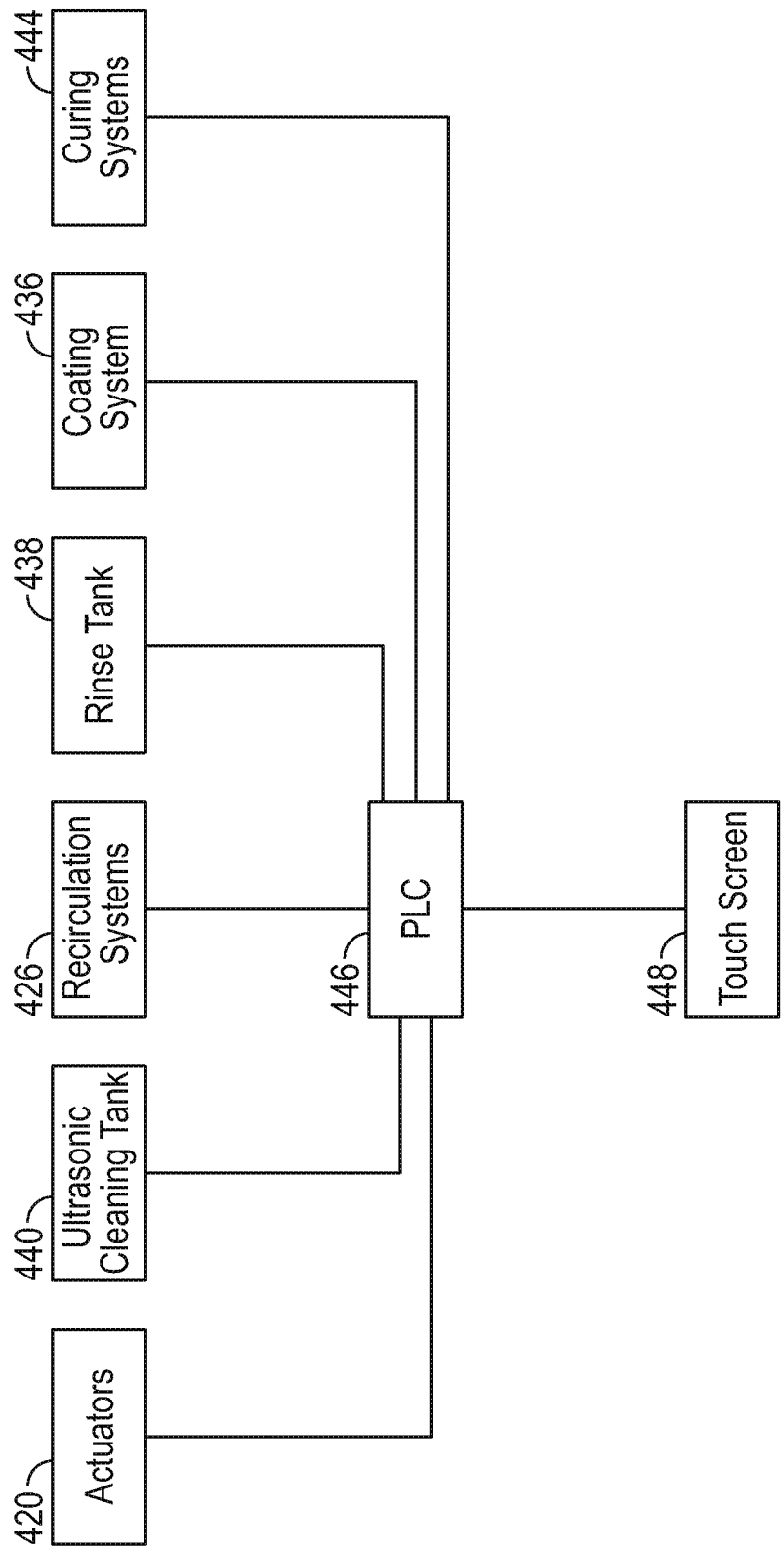
FIG. 10 is a block diagram of an exemplary control system which is suitable for implementation of the substrate deposition system illustrated in FIGS. 8 and 9.

Referring next to FIGS. 8-10 of the drawings, an illustrative embodiment of a substrate deposition system is generally indicated by reference numeral 400. The substrate deposition system 400 may include a frame 401 which supports the system components which will be hereinafter described. As illustrated in FIG. 8, in some embodiments, the frame 401 may include a base frame portion 402 and an upper frame portion 403 on the base frame portion 302. As illustrated in FIG. 9, the system components may be supported by the system frame 401. The system components may include a first staging area 410. Multiple processing tanks 412a-412i may be located downstream, or in the direction of process flow, relative to the first staging area 410 and each other. The processing tanks 412a-412i may contain supplies of liquid coating material (not illustrated) such as primers and/or high light refractive index, low light refractive index or anti-fog coatings, for example and without limitation. The liquid coating materials may be of the ultraviolet or thermal cure types. In some applications, one or more of the processing tanks 412a-412i may include a dry tank. In various embodiments, the substrate deposition system 400 may include a lesser or greater number of processing tanks. At least one linear actuator 420 may be adapted to transfer at least one substrate holder 422 which holds at least one substrate 424 from the first staging area 410 to and between the processing tanks 412a-412i, respectively. In some embodiments, the linear actuators may include linear actuators 420a-420o, respectively. Each linear actuator 420a-420o may be mounted to traverse a rail system or other suitable support (not illustrated) and may be adapted to first submerge the substrate holder 422 which contains the substrate 424 in the liquid coating material in each of the processing tanks 412a-412i; remove the substrate holder 422 from the liquid coating material; allow the residual liquid coating material to drip from the substrate 424 into the processing tank; and transfer the substrate holder 422 to the next processing tank in the series. In some embodiments, a single actuator 420 may perform the substrate immersion and transfer operations at the respective processing tanks.

As further illustrated in FIG. 9, in some embodiments, a recirculation system 426 may be disposed in fluid communication with each of at least some of the processing tanks 412a-412i. In some embodiments, a recirculation system 426 may be disposed in fluid communication with each of the processing tanks 412a, 412c, 412e, 412g and 412h. Each recirculation system 426 may be adapted to circulate liquid coating material in each corresponding processing tank. Each recirculation system 426 may also be adapted to catch overflow liquid coating which spills over the sides of each processing tank and return the overflow liquid to circulation.

A second staging area 434 may be provided downstream from the last processing tank in the series such as the processing tank 412i. A linear actuator 420j may be adapted to transfer the substrate holder 422 from the last processing tank in the series, such as the processing tank 412i, to the second staging area 434. A coating system 436, which in some embodiments may be a Fusion-M inline coating system which is available from Quantum Innovations (www.qt-mi.net), may be provided downstream of the second staging area 434. The coating system 436 may be adapted to apply an antireflective (AR) or other coating to one or more surfaces of the substrate 424. A linear actuator 420k may be adapted to transfer the substrate holder 422 from the second staging area 434 to the coating system 436 for coating of the substrate 424 with the antireflective or other coating. In some embodiments, the coating system 436 may be a standalone system which operates separately from the substrate deposition system 400. In other embodiments, the coating system 436 may be a component part of the substrate deposition system 400.

The substrate deposition system 400 may include at least one curing system (not illustrated) which cures the coatings deposited on the substrate 424. In some embodiments, an actuator 420k may be adapted to transfer substrate holders 422 and substrates 444 from the coating system 436 to the curing system. The curing system may have ultraviolet or thermal curing capabilities. In thermal curing, provision may be made to allow for pre-curing with subsequent full curing inside and/or outside the substrate deposition system 400.

In some embodiments, the substrate deposition system 400 may include at least one rinse tank 438 and/or at least one ultrasonic cleaning tank 440 which may be provided on the system frame 1. The rinse tank 438 and the ultrasonic cleaning tank 440 may be adapted to rinse and clean the substrate holders 422 as well as other hardware and components which may require rinsing and cleaning.

As illustrated in FIG. 10, a PLC (Programmable Logic Controller) 446 may interface with the actuators 420, the ultrasonic cleaning tank 440, the recirculation systems 426, the rinse tank 438, the coating system 436 and the curing systems 444 as well as any additional functional components of the substrate deposition system 400. A touch screen or other HMI (Human Machine Interface) may controllably interface with the PLC 446 for control of the actuators 420, the ultrasonic cleaning tank 440, the recirculation systems 426, the rinse tank 438, the coating system 436, the curing systems 44 and other components.

In exemplary application, the system 400 provides a uniform hard coating on both sides of a substrate 424 such as an ophthalmic lens, for example and without limitation. The coating fabrication recipe may be programmed into the PLC 446 (FIG. 10), which may operate the actuators 420 as the actuators 420 successively immerse and transfer the substrate holders 422 and substrates 424 in the liquid coating material in the respective processing tanks 412a-412i and apply the preliminary coatings to the substrate 424. After immersion and prior to transfer to the next processing tank, each substrate 424 may be held over the processing tank in which it was immersed until the residual liquid coating material drips into the processing tank. During operation, the recirculation systems 426 may catch overflow from and continually recirculate the liquid coating material in each processing tank.

After the preliminary coatings are applied, the actuator 420d may place the substrates 424 at the second staging area 434. From the second staging area 434, the actuator 420e may transfer the substrates 424 to the coating system 436, where the AR coating is applied to the substrates 424. One of the actuators 420l-o may transfer the AR-coated substrates 424 from the coating system 436 to the curing systems, where the AR coating on the substrates 424 is cured. The curing systems 444 may allow for multiple curing methods for the AR coating on each substrate 424. The rinse tank 438 and the ultrasonic cleaning tank 440 may be operated to rinse and clean the substrate holders 422 as well as other hardware and components which may require rinsing and cleaning.

It will be appreciated by those skilled in the art that the preliminary coatings which are applied to the substrates 424 may be light refractive index-matched to the base substrate 424 to form a hard coating which determines the quality of the AR coating which is subsequently applied. Index matching may help to eliminate birefringence (Newton Rings). The substrate deposition system 400 facilitates formation of multiple hard coats on each substrate 424 using one machine and reduces the need to change the hard coating in a batch machine to accommodate multiple light refractive indexes. Moreover, the substrate deposition system 400 may provide for other coatings such as anti-fog coatings without the need to change the coating for each type.

In single substrate flow applications, the substrate deposition system 400 may have the capability to provide a substrate 424 every 3 minutes on average. This rate of completion may allow for higher throughput in a day, allowing substrates 424 to be further processed without having to wait for the completion of a batch cycle. Use of multiple index matching eliminates the need to change coatings for each type of base substrate, which can be costly. Use of multiple cure methods may allow for the use of coatings that are both UV curable and thermal curable. Consequently, the coating process is highly efficient and is conducive to high throughput and a large number of options to the operating personnel.

While various illustrative embodiments of the disclosure have been described above, it will be recognized and understood that various modifications can be made in the disclosure and the appended claims are intended to cover all such modifications which may fall within the spirit and scope of the embodiments of the disclosure.

What is claimed is:

1. A lens surface location measuring system for a substrate deposition system having a deposition source, comprising:
    a sensor support frame, the sensor support frame adapted to support at least one substrate in the substrate deposition system; and
    a pair of sensor assemblies carried by the sensor support frame, the pair of sensor assemblies including a pair of lens surface location measuring sensors, respectively, adapted to measure the location of opposite surfaces of the substrate relative to the deposition source.

2. The lens surface location measuring system of claim 1 wherein the pair of sensor assemblies comprises a pair of sensor mount brackets, respectively, carried by the sensor support frame, and the pair of lens surface location measuring sensors is carried by the pair of sensor mount brackets.

3. The lens surface location measuring system of claim 2 wherein the pair of sensor mount brackets comprises a pair of bracket attachment portions, respectively, carried by the sensor support frame and a pair of sensor support portions, respectively, carried by the pair of bracket attachment portions.

4. The lens surface location measuring system of claim 3 further comprising a pair of bracket reinforcing portions extending from the pair of sensor support portions to the pair of bracket attachment portions of the pair of sensor mount brackets, respectively.

5. The lens surface location measuring system of claim 1 wherein the pair of lens surface location measuring sensors each comprises a sensor housing carried by the sensor support frame and a sensor tip carried by the sensor housing, the sensor tip adapted for placement at the at least one substrate.

6. The lens surface location measuring system of claim 5 further comprising a sensor handle extending from the sensor housing.

7. The lens surface location measuring system of claim 1 further comprising a substrate space within the sensor support frame; and at least one fixture holder positioned in the substrate space.

8. The lens surface location measuring system of claim 1 wherein each lens surface location measuring sensor has a capability to measure a location of the substrate relative to a deposition source of the deposition system.

9. The lens surface location measuring system of claim 1 wherein each sensor assembly includes a sensor mount bracket.

10. The lens surface location measuring system of claim 9 wherein each sensor mount bracket is triangular in shape.

11. The lens surface location measuring system of claim 10 wherein each sensor mount bracket further comprises a bracket attachment portion, a sensor support portion extending perpendicularly outwardly from the bracket attachment portion and an angled bracket reinforcing portion extending between the sensor support portion and the bracket attachment portion.

12. The lens surface location measuring system of claim 11 wherein the bracket attachment portion of each sensor mount bracket is attached to a corresponding side of the sensor support frame.

* * * * *